United States Patent [19]

Togashi et al.

[11] Patent Number: 5,017,654
[45] Date of Patent: May 21, 1991

[54] THERMOSETTING ORGANOSILOXANE COMPOSITION

[75] Inventors: Atsushi Togashi, Ichihara; Toshio Saruyama, Narashino, both of Japan

[73] Assignee: Toray Silicone Company, Limited, Tokyo, Japan

[21] Appl. No.: 372,579

[22] Filed: Jun. 28, 1989

[30] Foreign Application Priority Data

Jun. 30, 1988 [JP] Japan ............................... 63-163877

[51] Int. Cl.$^5$ .............................................. C08F 8/00
[52] U.S. Cl. .................................... 525/100; 525/106; 525/477; 525/478; 528/15
[58] Field of Search .................. 528/15; 525/100, 106, 525/477, 478

[56] References Cited

U.S. PATENT DOCUMENTS

| | | | |
|---|---|---|---|
| 4,465,818 | 8/1984 | Shirahata et al. | 528/15 |
| 4,481,341 | 11/1984 | Schlak et al. | 525/478 |
| 4,594,134 | 6/1986 | Hanada et al. | 528/15 |
| 4,766,176 | 8/1988 | Lee et al. | 528/15 |
| 4,784,879 | 11/1988 | Lee et al. | 528/15 |
| 4,874,667 | 10/1989 | Lee et al. | 528/15 |

FOREIGN PATENT DOCUMENTS 134786 12/1974 Japan .

Primary Examiner—Melvyn I. Marquis
Attorney, Agent, or Firm—Robert Spector

[57]　ABSTRACT

The combination of a microencapsulated hydrosilylation catalyst selected from the group consisting of metals from the platinum group of the periodic table and compounds of these metals and a known inhibitor for this type of catalyst impart excellent storage stability to organosiloxane compositions that cure by a hydrosilation reaction while enabling these compositions to rapidly cure at temperatures above the softening temperature of the thermoplastic resin used to encapsulate the hydrosilylation catalyst. The curing rate of the composition is faster relative to compositions containing the microencapsulated catalyst without the catalyst inhibitor.

4 Claims, No Drawings

THERMOSETTING ORGANOSILOXANE COMPOSITION

BACKGROUND OF THE INVENTION

1. Field of the Invention

The present invention relates to a thermosetting organosiloxane composition which cures by means of the hydrosilylation reaction. More particularly, the present invention relates to a hydrosilylation-curing thermosetting organosiloxane composition which has an excellent storage stability at temperatures close to room temperature but which also exhibits excellent curing properties at elevated temperatures.

2. Description of the Prior Art

Because they cure rapidly even in deep sections without generating reaction by-products, hydrosilylation reaction-curing organosiloxane compositions are employed throughout a broad range of fields, for example, as adhesives, as potting and coating materials for electric and electronic components, and as release coatings for papers and films.

However, such organosiloxane compositions suffer from an exceedingly poor storage stability, and they cannot be stored enclosed in a single container. As a consequence, they must generally be stored with their ingredients divided up into at least two containers, one of which contains the organohydrogenpolysiloxane and the other the hydrosilylation reaction catalyst. In order to avoid this problematic attribute, it has been proposed that the catalytic activity of the hydrosilylation-reaction catalyst, and particularly of platinum-containing catalysts, be restrained or suppressed. One such approach comprises the use of an additive which has the capacity to restrain or check the catalytic activity of platinum-type catalysts, and such additives are exemplified by benzotriazoles, acetylenic compounds, hydroperoxy compounds, etc. Unfortunately, when a long-term storage stability is sought using such methods, the curing properties are compromised and, among other things, the time required for curing at elevated temperatures is lengthened. While an curable organosiloxane composition with an excellent storage stability is in fact obtained, it will not be a rapidly curing organosiloxane composition.

The prior art has attempted to improve the storage stability of platinum-containing hydrosilylation catalysts. One method for accomplishing this is disclosed in Japanese Patent Application Laid Open [Kokai] Number 49-134786 [134,786/74], which teaches the preparation of a platinum-type catalyst in powder form. Silicone resin and a platinum compound catalyst adsorbed on a finely divided material such as quartz powder, are mixed and kneaded on a hot roll, and the resulting mixture is pulverized or ground.

U.S. Pat. No. 4,481,341, which issued to Schlak et al. on Nov. 6, 1984 describes thermosetting organosiloxane compositions comprising a polyorganosiloxane containing at least two ethylenically unsaturated hydrocarbon radicals per molecule, a polyorganohydrogensiloxane containing at least two silicon bonded hydrogen atoms per molecule and a platinum-containing catalyst that is dispersed in a finely divided, solid material, such as a silicone resin, at a concentration of from 0.001 to 5 percent by weight of platinum metal.

The finely divided material in which the catalyst is dispersed is virtually insoluble in either the aforementioned polyorganosiloxane or polyorganohydrogensiloxane and melts or softens at a temperature between 70 and 250 degrees C. The alleged advantage of these compositions disclosed by Schlak et al. is that the catalyst remains isolated from the other ingredients of the curable composition until the composition is heated sufficiently to melt the material in which the catalyst is dispersed. Because the organosilicon compounds present in the composition will not cure in the absence of the catalyst, the composition can allegedly be stored for long periods of time without undergoing curing or even an increase in viscosity.

A disadvantage of Schlak et al. catalyst resides in the method used to prepare the catalyst composition. A solid block or sheet of resin containing the platinum composition dispersed throughout is ground to a fine powder. The random nature of the grinding operation makes it possible that some of the particles will contain platinum catalyst on their surface. Even trace amount of platinum have been shown to cause premature curing of the type of organosiloxane composition exemplified in this patent.

U.S. Pat. No. 4,784,879, which issued to Lee et al. on Nov. 15, 1988 describes the preparation of an encapsulated form of a platinum-containing hydrosilylation catalyst. The platinum-containing catalyst is encapsulated within one or two layers of thermoplastic organic polymers. The catalyst is prepared by polymerization or precipitation of the encapsulating polymer in the presence of the catalyst. The resultant microcapsules are then washed with a liquid that is a solvent for the catalyst but not for the encapsulating polymer. The exemplified compositions require one washing with methanol and one with cyclic dimethylsiloxane oligomers to ensure their storage stability when incorporated into a curable organosiloxane composition.

SUMMARY OF THE INVENTION

The present inventors achieved the present invention as the result of extensive research directed at solving the problems enumerated above. One objective of the present invention is to provide a thermosetting organosiloxane composition exhibiting excellent storage stability in the vicinity of room temperature, but which cures rapidly at elevated temperatures. The present inventors discovered that this objective can be achieved by using a microencapsulated platinum-containing hydrosilylation reaction catalyst in combination with a conventional inhibitor for this type of catalyst.

DETAILED DESCRIPTION OF THE INVENTION

The present invention provides an improved thermosetting organosiloxane composition comprising (A) an organopolysiloxane having at least two silicon-bonded alkenyl groups in each molecule and represented by the average unit formula $$R_a SiO_{(4-a)/2}$$

wherein R is a substituted or unsubstituted monovalent hydrocarbon radical and the value of a is from 1.0 to 2.3;

(B) an organohydrogenpolysiloxane containing at least two silicon-bonded hydrogen atoms in each molecule in an amount sufficient to cure said organopolysiloxane;

(C) an amount of hydrosilylation-reaction catalyst sufficient to promote curing of said composition, where said catalyst is microencapsulated by a thermoplastic resin exhibiting a softening temperature of from 40 to 250 degrees Centigrade.

The improvement comprises the presence in said composition of (D) a hydrosilylation reaction-inhibiting compound selected from the group comprising compounds having at least 1 alkynyl group in each molecule, organosilicon compounds containing the alkenyl group and alcoholic hydroxyl group in each molecule, and organosilicon compounds containing a bonding unit in which alkenyl is bonded to each of two silicon atoms adjoined through an oxygen atom bridge, the amount of said inhibiting compound being sufficient to accelerate curing of said composition at temperatures above the softening temperature of said thermoplastic resin.

The Alkenyl Substituted Organopolysiloxane

The alkenyl substituted organopolysiloxane, referred to hereinafter as component A is the main or principal component of the present thermosetting compositions, and it must contain at least two silicon-bonded alkenyl groups in each molecule. The groups R in the preceding formula for this organopolysiloxane are selected from at least one member of the group consisting of monovalent hydrocarbon groups as exemplified by alkyl groups such as methyl, ethyl, propyl, butyl, hexyl, and octyl; alkenyl groups such as vinyl, allyl, and hexenyl; aryl groups such as phenyl; and substituted hydrocarbon groups such as 3,3,3-trifluoropropyl. The value of a in the foregoing formula is from 1.0 to 2.3, inclusive. This organopolysiloxane may also contain hydroxyl or alkoxy groups. With regard to its molecular structure, this organopolysiloxane may have a straight chain or branched siloxane skeleton. Furthermore, while its degree of polymerization is not particularly crucial, a general rule, organopolysiloxanes with a viscosity at 25 degrees Centigrade within the range of 10 to 1,000,000 centipoise should be used.

The Organohydrogenpolysiloxane

The organohydrogenpolysiloxane, referred to hereinafter as the component B of the present compositions, is used as a crosslinker for the organopolysiloxane comprising component A. Component B must contain at least two silicon-bonded hydrogen atoms in each molecule in order for the present compositions to form a network structure. Besides the hydrogen atom, the silicon-bonded organic groups are exemplified by those given above for component A. Within a single molecule, these organic groups may consist of only a single species or may consist of mixtures of two or more species. The molecular structure of the organohydrogenpolysiloxane may be straight chain, network, or three dimensional, and this component may be a single polymer or copolymer or may consist of a mixture of two or more species of polymers.

With regard to the degree of polymerization of the organohydrogenpolysiloxane, as a general rule its viscosity should fall within the range of from 0.5 to 50,000 centipoise (0.0005 to 50 Pa.s) at 25 degrees Centigrade, preferably from 1 to 10,000 centipoise (0.001 to 10 Pa.s).

The amount of component B is sufficient to provide a molar ratio of silicon-bonded hydrogen atoms in this component to the silicon-bonded alkenyl groups in component A that is preferably from 0.5 to 10. As a general rule the concentration of component B is from 0.1 to 10 weight parts per 100 weight parts component A.

The Microencapsulated Platinum-Containing Catalyst

Component C, a thermoplastic resin-microencapsulated hydrosilylation reaction catalyst, promote crosslinking of the silicon-bonded alkenyl groups of component A with the silicon-bonded hydrogen atoms of component B. All previously known transition metals and compounds thereof that exhibit catalytic activity in hydrosilylation reactions can be used as component C. Concrete examples are rhodium-based catalysts, palladium-based catalysts such as tetrakis(triphenylphosphine)palladium, and platinum catalysts such as chloroplatinic acid, alcohol-modified chloroplatinic acid, platinum/olefin complexes, platinum/ketone complexes, platinum/vinylsiloxane complexes, platinum supported on alumina, silica, or carbon black, and platinum black.

Among these catalysts, platinum/vinylsiloxane complexes are preferred based on their high activity and compatibility with components A and B.

The hydrosilylation-reaction catalyst is microencapsulated by a thermoplastic resin with a softening point in the range of 40 to 250 degrees Centigrade. Any thermoplastic resin can be used as the encapsulant so long as it is essentially impermeable to the hydrosilylation-reaction catalyst and essentially insoluble in component A. Examples of thermoplastic resins which can be used in as the encpasulant portion of component C are polymethyl methacrylate, polystyrene, methylcellulose, silicone resins, and polysilanes.

Any of the known methods can be used to microencapsulate the hydrosilylation-reaction catalyst in a thermoplastic resin film or coating. These methods include but are not limited to chemical methods such as interfacial polymerization and in-situ polymerization, physicochemical methods such as coacervation and emulsion/suspension hardening, and physical mechanical methods such as spray drying. Of these methods, emulsion/suspension hardening is advantageous because it can use a wide range of thermoplastic resins and it relatively readily affords microcapsules with a narrow particle size distribution.

The microcapsules generated by these methods can be used directly as a component C without modification. However, in order to obtain a thermosetting organopolysiloxane composition with an elevated storage stability, it is advantageous to remove hydrosilylation-reaction catalyst present at the surface by washing the microcapsules with a suitable washing solvent. Suitable washing solvents in this regard are those in which the hydrosilylation-reaction catalyst is soluble and the thermoplastic resin is insoluble. Such washing solvents are exemplified by alcohols such as methyl alcohol and ethyl alcohol, and by low molecular-weight organopolysiloxanes such as hexamethyldisiloxane, etc. The average particle size of component C should fall within the range of 1 to 500 micrometers as a general matter and preferably falls within the range of 3 to 100 micrometers. When the average particle size falls below 1 micrometer, the hydrosilylation-reaction catalyst intake during production suffers from a drastic decline, while the dispersion stability in the diorganopolysiloxane comprising component A is compromised in excess of 500 micrometers.

The weight ratio of hydrosilylation-reaction catalyst to thermoplastic resin cannot be specifically restricted because it varies substantially according to the method for microcapsule preparation. However, it is advantageous for the content of hydrosilylation-reaction catalyst in component C to be at least 0.01%. At less than 0.01%, the proportion of thermoplastic resin present in the composition of the present invention becomes too high, and the properties of the cured composition will be compromised. The quantity of addition of component C in general will be within the range of from 0.000001 to 0.1 weight part, based on platinum, per 100 weight parts organopolysiloxane comprising component A, and preferably falls within the range of 0.00005 to 0.01 weight parts as platinum per 100 weight parts organopolysiloxane comprising component A. Component C itself is typically present at a concentration of from 0.005 to 100 weight part; however, it may be used in excess of this weight part range as long as the above platinum-based weight part range is observed. The platinum-based weight range is calculated based on the number of platinum atoms, this range must therefore be recalculated when a transition metal other than platinum is used.

The Hydrosilylation Reaction Inhibitor

Component D is the essential component for accelerating or promoting the curing rate when the composition of the present invention is cured at elevated temperatures. This component comprises a hydrosilylation-reaction inhibiting compound selected from the group comprising compounds having at least 1 alkynyl group in each molecule, organosilicon compounds containing the alkenyl group and alcoholic hydroxyl group in each molecule, and organosilicon compounds in which alkenyl is bonded to each of two silicon atoms which are adjoined through an oxygen atom bridge. Surprisingly, the curing rate of the present compositions is accelerated relative to compositions prepared from the same components with the exception that the inhibitor is omitted.

Preferred inhibitors have a boiling point in excess of 80 degrees Centigrade at ambient pressure and which have a high solubility in the organopolysiloxane comprising component A. If the boiling point of component D is below 80 degrees Centigrade, this component will be easily volatilized from the present compositions at the time of thermal curing. Furthermore, if component D exhibits a low solubility in component A, this results in a decline in the interaction during thermal curing between components A, B, and the hydrosilylation-reaction catalyst bled out from the microcapsules. In either case, the cure-accelerating effect of component D is not obtained.

Compounds corresponding to component D that contain at least one alkynyl group in each molecule may or may not contain silicon within the molecule. Examples of silicon-containing compounds include but are not limited to:

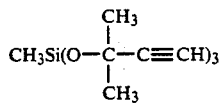

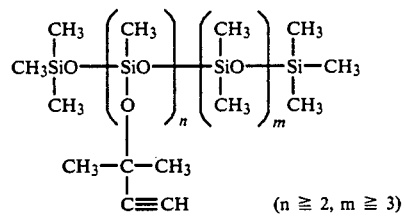 (n ≧ 2, m ≧ 3)

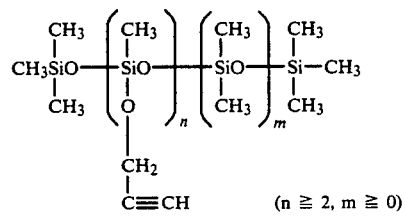 (n ≧ 2, m ≧ 0)

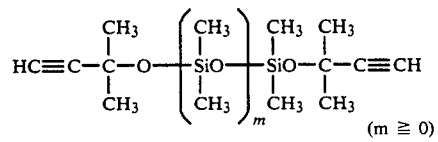 (m ≧ 0)

Examples of non-silicon-containing compounds include but are not limited to 1,5-hexadiyne and 1,6-heptadiyne and compounds containing both alkynyl and alcoholic hydroxyl within the molecule. Compounds containing alkynyl radicals and hydroxyl groups on different carbon atoms are particularly preferred. Examples of such preferred compounds are 2-methyl-3-butyne-2-ol, 2-phenyl-3-butyne-2-ol, 1-ethynyl-1cyclohexanol, and 3-methyl-1-hexyne-3ol.

With regard to organosilicon compounds containing alkenyl radicals and alcoholic hydroxyl groups in each molecule, bonding of the unsaturated alkenyl carbon atom and hydroxyl group across at least one carbon atom is preferred. Examples of such compounds include but are not limited to:

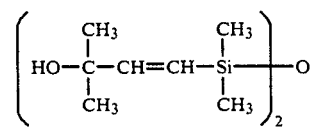

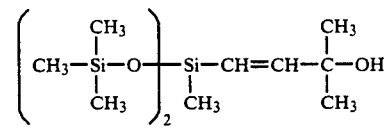

The following are examples of organosilicon compounds containing a bonding unit in which an alkenyl radical is bonded to each of two silicon atoms which are linked by an oxygen atom:
1,3-divinyltetramethyldisiloxane,
1,3,5,7-tetravinyltetramethylcyclotetrasiloxane,
1,3-divinyl-1,3-diphenyldimethyldisiloxane.

The degree of cure-accelerating effect due to component D varies substantially with the chemical structure of component D. The quantity of addition of component D, should therefore be adjusted to the optimal quantity on an individual basis according to the component D used. As a general rule, this concentration of this component preferably falls within the range of from 0.00001 to 5 weight parts per 100 weight parts component A. A cure-accelerating effect is not obtained when this quantity of addition is too small while, conversely, curing is inhibited rather than accelerated when this quantity of addition is too large.

Additional Ingredients

The present organosiloxane composition contain, as a minimum, components A through D. Additional ingredients can be added as necessary or desired so long as the objective of this invention is not impaired. These additional ingredients include but are not limited to: microparticulate silicas such as fumed silicas and wet-method silicas; surface-hydrophobicized microparticulate silicas; crepe-hardening inhibitors; polymers other than organopolysiloxane; organic solvents; heat stabilizers such as iron oxide and rare earth compounds; flame retardants such as manganese carbonate and fumed titanium oxide; and fillers such as quartz powder, diatomaceous earth, calcium carbonate, glass fiber and carbon black.

Preparation of Curable Compositions

The compositions of the present invention are readily prepared by mixing the aforementioned components A through D to uniformity. The order of mixing is not particularly critical, however it may be advantageous to mix and uniformly disperse component C into a small quantity of component A and then added this to the mixture of the remaining component A in addition to components B, and D. Any means can be used to mix the components as long as the microencapsulated hydrosilylation-reaction catalyst comprising component C is not destroyed. The temperature conditions in this process will vary with the component C used, and so cannot be stipulated unconditionally. However, it is essential that the temperature be below the softening point or melting point of the thermoplastic resin present in component C.

Because the compositions of the present invention as described above have an excellent storage stability in the vicinity of room temperature, they can be stored on the long term as a single-package organopolysiloxane composition. At the same time, because they cure rapidly at high temperatures, they can be swiftly cured by heating.

The present compositions are exceedingly useful as a silicone rubber compositions, silicone gel compositions, or silicone resin compositions where such properties are required.

EXAMPLES

The following examples describe preferred embodiments of the present compositions, and should not be interpreted as limiting the scope of the invention as defined in the accompanying claims. Unless otherwise indicated all parts are by weight, viscosity values were measure at 25° C. and Pa.s=pascal seconds (1000 centipose=1 pascal second).

REFERENCE EXAMPLE 1

Preparation of platinum/vinylsiloxane complex 160g 1,3-divinyltetramethyldisiloxane and 32.0g chloroplatinic acid ($H_2PtCl_6 \cdot 6H_2O$) were and then blended with heating for 1 hour at 120 degrees Centigrade under a nitrogen flow. A reaction product containing the complex of chloroplatinic acid and 1,3-divinyltetramethyldisiloxane was subsequently obtained by first removing the platinum black by-product by filtration and then removing the acid with a water wash. The platinum metal concentration in this reaction product was 4.25%.

REFERENCE EXAMPLE 2

Preparation of a polystyrene-encapsulated platinum catalyst 8.0 g polystyrene exhibiting a softening point of 82 degrees Centigrade and 1.0 g of the platinum/vinylsiloxane complex catalyst prepared as described in Reference Example 1 were dissolved in 165 g methylene chloride. This methylene chloride solution was added with stirring to water containing 7.5 g polyvinyl alcohol (Gosenol GL-05 from Nippon Gosei Kagaku Kogyo Kabushiki Kaisha). The methylene chloride was then removed by evaporation over a 40 hour period within a temperature range of from 25 to 40 degrees Centigrade. A particulate material was isolated from the resulting suspension using a centrifugal separator. This particulate was washed sequentially with water, a large quantity of methyl alcohol and, finally, with hexamethyldisiloxane to yield platinum catalyst-containing microcapsules with an average particle size of 7 micrometers and a platinum content of 0.24%.

REFERENCE EXAMPLE 3

Preparation of a polymethyl methacrylate-encapsulated platinum catalyst

A microencapsulated platinum catalyst with an average particle size of 10 micrometers and a platinum content of 0.10% were prepared according to the procedure of Reference Example 2, but using 8.0 g polymethyl methacrylate having a softening point of 110 degrees Centigrade and an average molecular weight of 93,000, in place of the polystyrene used in Reference Example 2.

REFERENCE EXAMPLE 4

First preparation of a platinum catalyst microencapsulated in a silicone resin 2.0 g of the platinum/vinylsiloxane complex catalyst described in Reference Example 1 and 16.0 g silicone resin were dissolved in 330 g methylene chloride. The resin exhibited a softening point of 10 degrees Centigrade and contained 12 mole% diphenylsiloxane units, 21 mole% dimethylsiloxane units, and 67 mole% monophenylsiloxane units. This methylene chloride solution was added to water containing 15 g polyvinyl alcohol (Gosenol GL-05 from Nippon Gosei Kagaku Kogyo Kabushiki Kaisha) while the water was stirred. The methylene chloride was then removed by evaporation over a 48 hour period within a temperature range of from 25 to 40 degrees Centigrade, and the particulate material was isolated from the resultant suspension using a centrifugal separator.

Platinum catalyst-containing microencapsules with an average particle size of 7 micrometers and a platinum content of 0.21% were obtained by washing the particulate material sequentially with water and then with a large quantity of methyl alcohol.

REFERENCE EXAMPLE 5

Second preparation of a silicone resin-encapsulated platinum catalyst 16 g of the silicone resin described in Reference Example 4 and 2.0 g of the platinum/vinylsiloxane complex catalyst described in Reference Example 1 were dissolved in 330 g methylene chloride. The methylene chloride was then gradually evaporated off with stirring to yield a solid in flake form. This was ground and then washed with water and methanol to yield a microencapsulated platinum catalyst with an average particle size of 10 micrometers and a platinum metal content of 0.40%.

REFERENCE EXAMPLE 6

Preparation of a polysilane-encapsulated platinum catalyst

Platinum catalyst microcapsules with an average particle size of 10 micrometers and a platinum content of 0.27% were prepared by following the procedure described in Reference Example 2, but using 8.0 g of a polyphenylmethylsilane exhibiting a softening point of 135 degrees Centigrade in place of the polystyrene used in Reference Example 2.

EXAMPLE 1

A curable organopolysiloxane composition was prepared as follows: 20 g hexamethyldisilazane-hydrophobicized fumed silica was thoroughly mixed into 100 g alpha,omega-divinylpolydimethylsiloxane with a viscosity of 1,500 cp (1.5 Pa.s), followed by the addition with mixing to homogeneity of 2.8 g of a dimethylhydrogenpolysiloxane represented by the following average molecular formula

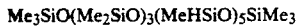

$Me_3SiO(Me_2SiO)_3(MeHSiO)_5SiMe_3$ and 0.01 g phenylbutynol, and, finally, 0.50 g of the polymethyl methacrylate-encapsulated platinum catalyst prepared as described in Reference Example 3 was mixed in. The thermal curing properties of this composition were measured at 130 degrees Centigrade using a Model 3 Curastometer from the Toyo Baldwin Company. The thermal curing properties evaluated were (a) the time until the initiation of curing ($I_t$) and (b) the time to reach 90% of the maximum torque valve ($T_{90}$). The storage stability of this composition was examined by monitoring the viscosity change at 25 degrees Centigrade. For comparison, a curable organopolysiloxane composition was prepared as described in the preceding section of this example, with the modification that no phenylbutynol was added. The curing properties of the comparison composition were measured as described in the preceding section of this example, and the data are reported in Table 1 as Comparison Example 1. Also for comparative purposes, a curable organopolysiloxane composition was prepared as described in the preceding portion of this example using the platinum/vinylsiloxane complex catalyst prepared as described in Reference Example 1 in place of the microencapsulated catalyst. The amount of this complex catalyst was equivalent to the platinum content of the microencapsulated catalyst. The curing properties of this comparative composition are also reported in Table 1 as Comparison Example 2.

TABLE 1

| property | Example 1 | Comparison Example 1 | Comparison Example 2 |
|---|---|---|---|
| curing properties | | | |
| $I_t$ (seconds) | 30 | 27 | 11 |
| $T_{90}$ (seconds) | 75 | 120 | 17 |
| storage stability | | | |
| immediately after preparation | 3.3 Pa.s | 3.3 Pa.s | 3.2 Pa.s |
| after 90 days | 4.3 Pa.s | 6.2 Pa.s | could not be measured (cured after 3 days) |

EXAMPLE 2

Curable organopolysiloxane composition were prepared as described in Example 1 with the following two modifications: 0.23 g of the polystyrene-encapsulated platinum catalyst prepared as described in Reference Example 2 was used in place of the polymethyl methacrylate-encapsulated platinum catalyst microencapsules used in Example 1, and the compounds reported in Table 2 were used as component D in place of phenylbutynol. For comparison, a curable organopolysiloxane composition was also prepared using the same microencapsulated catalyst but without any component D. The thermal curing properties of these compositions were measured as in Example 1, and the results are reported in Table 2.

TABLE 2

| type and quantity of addition | component D curing properties (130 degrees Centigrade) | |
|---|---|---|
| | $I_t$ (sec.) | $T_{90}$ (sec.) |
| 3-methyl-1-hexyne-3-ol (0.01 g.) | 31 | 55 |
| methyltris(3-methyl-1-butyne-3-oxy)silane (0.0002 g.) | 35 | 60 |
| none | 20 | 120 |

EXAMPLE 3

A curable organopolysiloxane composition was prepared following the procedure of Example 1 with the modification that 0.25 g. of a silicone resin-encapsulated platinum catalyst prepared as described in Reference Example 4 was used in place of the polymethyl methacrylate-encapsulated platinum catalyst of Example 1. For comparison, a curable organosiloxane composition was similarly prepared which did not contain phenylbutynol. The thermal cutting properties and storage stability of these curable organosiloxane compositions were measured as in Example 1, and these results are reported in Table 3 as Example 3 and Comparison Example 3. The comparison example did not contain the phenylbutynol.

TABLE 3

| property | Example 3 | Comparison Example 3 |
|---|---|---|
| curing properties | | |
| $I_t$ (seconds) | 36 | 15 |
| $T_{90}$ (seconds) | 58 | 240 |
| storage stability | | |
| viscosity immediately after preparation (Pa.s) | 3.2 Pa.s | 3.3 Pa.s |
| viscosity after 90 days | 4.5 Pa.s | 5.4 Pa.s |

EXAMPLE 4

Curable organosiloxane compositions were prepared using the general procedure of in Example 1 with the following two modifications: 0.25 g. of the silicone resin-encapsulated platinum catalyst prepared as described in Reference Example 4 was used in place of the polymethyl methacrylate-encapsulated platinum catalyst in Example 1, and the compounds reported in Table 4 were used as component D in place of phenylbutynol. The thermal curing properties of these curable organosiloxane compositions were measured as in Example 1, and these results are reported in Table 4.

TABLE 4

| | component (D) | |
|---|---|---|
| type and quantity of addition | curing properties (130° C.) | |
| | $I_t$ (seconds) | $T_{90}$ (seconds) |
| 1,3,5,7-tetravinyltetramethyl-cyclotetrasiloxane (0.15 g.) | 32 | 70 |
| disiloxane* (0.25 g.) | 28 | 75 |

EXAMPLE 5

A curable organosiloxane composition was prepared according to the procedure of Example 1 with the exception that 0.13 g. silicone resin-encapsulated platinum catalyst prepared as described in Reference Example 5 was used in place of the polymethyl methacrylate-encapsulated platinum catalyst used in Example 1. The curing properties of this composition were measured as in Example 1, and these measurement results are reported below.

$I_t$:40 seconds
$T_{90}$:60 seconds

EXAMPLE 6

A curable organosiloxane composition was prepared as in Example 1 with the modification that 0.50 g. of the polysilane-encapsulated platinum catalyst prepared as described in Reference Example 6 was used in place of the polymethyl methacrylate-encapsulated platinum catalyst of Example 1. For comparison, a curable organosiloxane composition was prepared as above which lacked phenylbutynol. The storage stability and curing properties of these compositions at 150 degrees Centigrade were measured as in Example 1, and these results are reported in Table 5 as Example 6 and Comparison Example 4.

TABLE 5

| property | Example 6 | Comparison Example 4 |
|---|---|---|
| curing properties | | |
| $I_t$ (seconds) | 1.1 | 1.2 |
| $T_{90}$ (seconds) | 7.0 | 11.0 |
| storage stability | | |
| immediately after preparation | 3.3 Pa.s | 3.3 Pa.s |
| after 90 days | 4.5 Pa.s | 5.6 Pa.s |

That which is claimed is:
1. In a thermosetting organosiloxane composition comprising
   (A) an organopolysiloxane having at least two silicon-bonded alkenyl groups in each molecule and represented by the average unit formula $R_aSiO_{(4-a)/2}$ wherein R is a substituted or unsubstituted monovalent hydrocarbon radical an the value of a is from 1.0 to 2.3;
   (B) an organohydrogenpolysiloxane containing at least two silicon-bonded hydrogen atoms in each molecule in an amount sufficient to cure said organopolysiloxane;
   (C) an amount of a hydrosilylation-reaction catalyst sufficient to promote curing of said composition, where said catalyst is microencapsulated by a thermoplastic resin exhibiting a softening point of 40 to 250 degrees Centigrade;
the improvement comprising the presence in said composition of
   (D) a hydrosilylation reaction-inhibiting compound selected from the group consisting of (1) compounds containing at least 1 alkynyl group in each molecule, (2) organosilicon compounds selected from the group consisting of

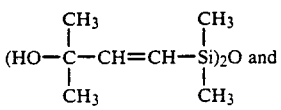

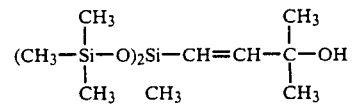

and (3) disiloxanes and cyclotetrasiloxanes containing at least one bonding unit in which an alkenyl radical is bonded to each of two silicon atoms joined through an oxygen atom bridge, where the amount of said inhibiting compound is sufficient to accelerate curing of said composition at temperatures above the softening point of said thermoplastic resin.

2. A thermosetting organopolysiloxane composition according to claim 1 in which the thermoplastic resin is selected from the group consisting of polystyrene, polymethyl methacrylate, silicone resins and polysilanes, the hydrosilylation-reaction catalyst is a metal from the platinum group of the periodic table or a compound of said metal and is present at a concentration of from 0.000001 to 0.1 part by weight, based on platinum, per 100 parts by weight of said organopolysiloxane, the boiling point of said inhibiting compound is at least 80° C., the concentration of said inhibiting compound is from 0.00001 to 5 parts by weight per 100 parts of said organopolysiloxane, and R represents at least one member selected from the group consisting of alkyl, alkenyl, aryl, and halogen-containing alkyl radicals, 3. Thermosetting organopolysiloxane composition of claim 2 wherein the hydrosilylation catalyst is a platinum/alkenylsiloxane complex, R is at least one member selected from the group consisting of methyl, phenyl and 3,3,3,-trifluoropropyl, said organopolysiloxane is a polydiorganosiloxane, and the concentration of said hydrosilylation reaction catalyst is equivalent to from 0.00005 to 0.01 part by weight of platinum per 100 parts by weight of said organopolysiloxane.

4. A thermosetting composition according to claim 1 where said disiloxanes and cyclotetrasiloxanes containing at least one bonding unit in which an alkenyl radical is bonded to each of two silicone atoms joined through an oxygen atom bridge are selected from the group consisting of 1,3-divinyltetramethyldisiloxane, 1,3,5,7-tetravinyltetramethylcyclotetrasiloxane, and 1,3-divinyl-1,3-diphenyldimethyldisiloxane.

* * * * *